United States Patent [19]
Schubert

[11] 3,946,510
[45] Mar. 30, 1976

[54] CHANGEABLE CHARACTER-SYMBOL SYSTEM

[75] Inventor: Wilfried Schubert, Lake Elmo, Minn.

[73] Assignee: National Advertising Company, Bedford Park, Ill.

[22] Filed: Aug. 12, 1974

[21] Appl. No.: 496,640

[52] U.S. Cl. ..................... 40/140; 40/16
[51] Int. Cl.² .......................... G09F 7/10
[58] Field of Search.. 40/142 R, 140, 132 D, 133 B, 40/132 R, 159, 64 R, 16, 65, 63 R

[56] References Cited
UNITED STATES PATENTS

| | | | |
|---|---|---|---|
| 1,117,360 | 11/1914 | Evans | 40/140 |
| 1,513,027 | 10/1924 | Belli | 40/64 R |
| 1,733,296 | 10/1929 | Dawson | 40/64 R |
| 1,965,118 | 7/1934 | Higgins | 40/64 R |
| 2,814,141 | 11/1957 | Friedman | 40/133 X |
| 3,458,944 | 8/1969 | Jimenez | 40/140 X |
| 3,753,306 | 8/1973 | Hemgren | 40/64 R |

FOREIGN PATENTS OR APPLICATIONS

| | | | |
|---|---|---|---|
| 70,700 | 3/1942 | Czechoslovakia | 40/16 |

*Primary Examiner*—Louis G. Mancene
*Assistant Examiner*—John F. Pitrelli
*Attorney, Agent, or Firm*—Merriam, Marshall, Shapiro & Klose

[57] ABSTRACT

Changeable copyboard apparatus for mounting changeable flat display image bearing characters, such as Oriental language characters, to a copyboard including transparent brackets for mounting the characters in a plurality of discrete display positions aligned in a series of vertical columns on the copyboard, the brackets including paired channel members with longitudinal channels and paired corner retainer brackets with corner channels mounted to the copyboard surface to define each discrete display position and further including convex surfaces enabling the flat display characters to be readily slidably inserted into the display position and restrained from substantial movement.

3 Claims, 5 Drawing Figures

U.S. Patent   March 30, 1976   3,946,510
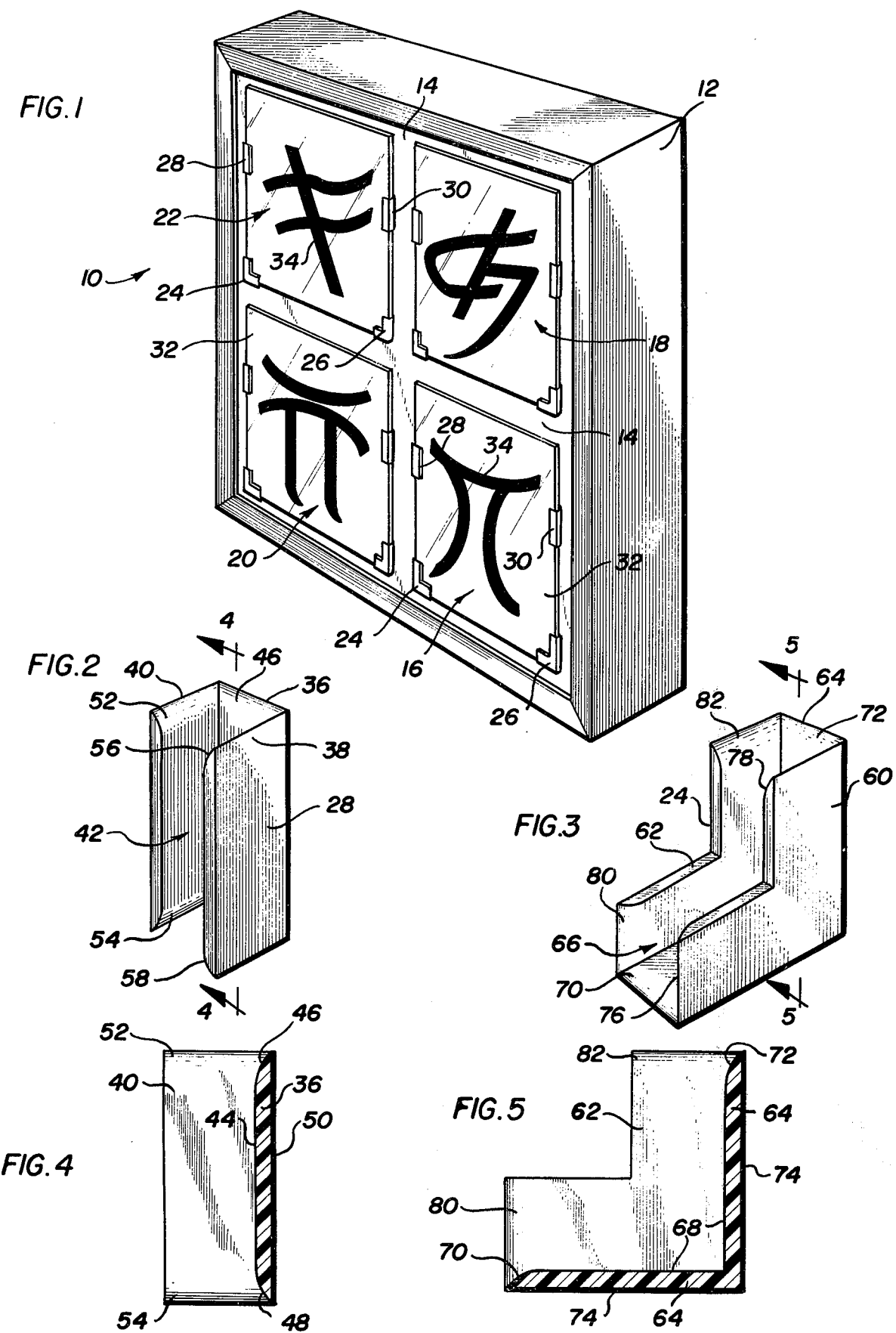

CHANGEABLE CHARACTER-SYMBOL SYSTEM

BACKGROUND OF THE INVENTION

This invention relates to changeable copyboard display systems and more particularly to apparatus for mounting changeable flat display characters to a copyboard.

In a co-pending application of Wilfried Schubert, U.S. Ser. No. 398,074, filed Sept. 17, 1973 and assigned to the same assignee here, there is presented as background to the invention therein set forth, the various types of most commonly used changeable copyboard systems. Briefly, reference may be made to U.S. Pat. No. 2,270,711 in which the block characters contain slots for mounting on hanger bars; U.S. Pat. No. 2,956,360 disclosing block characters with metal or plastic clips for mounting on hanger bars; and U.S. Pat. Nos. 3,407,525 and 3,531,884 which disclose a flat changeable display character inserted between and held by a slotted top and bottom track.

The aforementioned prior art relates to changeable display character systems using the Latin alphabet and wherein the Latin alphabet characters are read horizontally from the top-left corner of the display horizontally across from left to right continuing down the display to the bottom-right corner of the display. However, Chinese, Japanese and other Oriental languages use characters rather than an alphabet. Such Oriental characters could easily be confused by horizontal or vertical opaque or semi-opaque hanging bars of the prior art changeable copyboard systems. In addition, since in the Oriental languages the characters are read vertically from the bottom-right corner of the display vertically upward and from bottom to top continuing to the top-left corner of the display, the Oriental characters could not be conveniently mounted in position or maintained in their desired spacial position in such horizontally oriented prior art systems. Furthermore, should a horizontal hanging bar of the prior art system traverse behind an internally illuminated Oriental character, the character could easily assume an entirely different meaning in the Oriental language.

SUMMARY OF THE INVENTION

In accordance with the principles of the present invention, there is provided novel changeable copyboard display apparatus for use with characters in an Oriental language. A pair of preferably transparent channel members and brackets are rigidly mounted to a translucent copyboard background so as to define a single Oriental character position. Each display position is defined by a pair of transparent channel members at opposite sides of the display position and two transparent bottom retainer brackets at the bottom corners of the display position. A plurality of transparent channel members and bottom brackets are mounted on the copyboard frame to define a series of Oriental character positions. An Oriental display character can then be slipped into the channel members and dropped into the retainer brackets at the bottom at each display position. Each of the channel member's leading edge which receives the character is gently curved so as to facilitate the engaging and disengaging operation of the display character at the display positions.

BRIEF DESCRIPTION OF THE DRAWINGS

FIG. 1 is a perspective view of display apparatus according to the invention, including a pair of channel members and retainer brackets selectively mounted on a copyboard frame to define discrete Oriental character positions;

FIG. 2 is a perspective view illustrating one of the side channel brackets constructed in accordance with the present invention;

FIG. 3 is a perspective view of a bottom retainer bracket illustrating the curved leading edges to facilitate insertion and removal of the character;

FIG. 4 is a sectional view taken along section line 4—4 of FIG. 2 and illustrating the curved channel entry portion at the leading edge of the bracket; and FIG. 5 is a sectional view taken along section lines 5—5 of FIG. 3 illustrating the curved leading edge portion thereof.

DETAILED DESCRIPTION

Referring now to FIG. 1, there is illustrated a changeable copyboard 10 constructed in accordance with the principles of the present invention. The copyboard 10 includes a frame 12 having a copyboard background surface 14 which can be back illuminated from within the frame 12 by conventional illumination means.

In accordance with the principles of the present invention, there is provided a series of discrete display positions 16, 18, 20, 22 on the copyboard background 14. Each of the display positions 16–22 is defined by a pair of bottom corner retainer brackets 24, 26 and a pair of side channel longitudinal brackets 28, 30 which are rigidly mounted by a suitable adhesive on the surface 14 so as to define a respective display position for a changeable Oriental display character 32.

The copyboard surface 14 is ordinarily constructed of a translucent plastic material. The Oriental display characters 32 are each constructed of a thin, resilient translucent or transparent material with a display image 34 screen printed on one surface thereof in a color contrasting with the remainder of the display character. Thus, light from a light source contained within or behind frame 12 can pass through translucent background 14 and through the Oriental display characters 32 so as to highlight the respective display images 34 at each of the discrete display positions 16–22.

It is to be realized that although FIG. 1 illustrates only four discrete changeable Oriental display character positions, this illustration is only for purposes of describing the principles of the invention, and a larger plurality of display positions on a changeable copyboard frame can be provided as desired. In any event, the display is provided for use with Oriental characters which are read vertically from display position 16 at the bottom right corner of the copyboard background vertically to display position 18, then from the bottom left corner display position 20 vertically upward to the top left corner display position 22. Each of these discrete display positions is defined by a respective pair of bottom corner brackets 24, 26 and respective pair of side channel brackets 28, 30 mounted to the copyboard by means of a suitable adhesive. This is extremely important in a changeable copyboard display system for the Oriental languages since the Oriental characters are read vertically instead of horizontally as the alphabet characters in the Latin languages. Prior art changeable copyboards are normally provided with horizontal tracks without any discrete positions for each of the alphabets other than normally spacing them as desired on the horizontal tracks. Such prior art horizontal track hangers for changeable copyboards are thus not suitable for an Oriental language changeable copyboard system. In contrast to the prior art, the changeable Oriental language copyboard system 10 readily enables changes in the respective discrete vertical display positions shown in FIG. 1.

Referring now to FIGS. 2-5, there is shown the construction details of the side channel brackets 28, 30 and the bottom corner retainer brackets 24, 26. It is to be realized that the corner brackets 24, 26 can be of identical construction such that they may be used at either the left or the right corner at each display position. The same is true for the side channel brackets 28, 30 for use at either side of the respective display positions. Thus, although only one of each bracket is described herein, the description is the same for both.

The side channel bracket 28 is formed of a C-shaped transparent material and includes a longitudinal back portion 36 and opposite top and bottom longitudinal portions 38, 40 respectively. As seen in more detail in FIGS. 2 and 4, each of the C-shaped ends of bracket 28 are fluted from inside of a longitudinal channel 42 defined between bracket portions 36, 38 and 40 outwardly to the outer surfaces of each respective bracket portion. This is shown more clearly in the sectional view of FIG. 4 wherein the back portion 36 includes a straight longitudinal inner surface 44 with convex end surface portions 46, 48 extending outwardly to join a longitudinal straight outer surface 50. A similar pair of convex surfaces 52, 54 and 56, 58 are provided for the bottom and top channel portions 40, 38 respectively.

The convex surfaces on each of the side channel brackets 28, 30 enables the characters 32 to be readily mounted into the display position. The characters 32 are normally mounted on the background 14 by insertion of the top of the character into the bottom of the side channel brackets through, for example, the fluted convex portions 48, 54, 58 — and through channel 42 and high enough within the side channel members so as to clear the bottom corner brackets. The bottom of the character 32 can then be inserted into the bottom retainer brackets 24, 26 and slipped downwardly until the character comes to a mounted position in the corner retainer brackets. If desired, the character 32 may also be mounted on the copyboard 14 by inserting the character bottom through the top fluted convex channel portions 46, 52, 56 and through channel 42 until the character bottom rests within the bottom retainer corner brackets 24, 26.

Referring now to FIGS. 3 and 5, there is illustrated the construction details for the corner bracket 24. Each of the corner brackets 24, 26 is formed of an L-shaped transparent material including a top member 60, bottom member 62 and back member 64 which interconnects the top and bottom members to define an L-shaped corner channel 66 therebetween. The back member 64 includes a right angled inner surface 68 and a pair of fluted, convex surfaces 70, 72 at each end thereof. Back member 64 further includes a right angled outer surface 74. As can be seen in FIG. 5, the fluted convex surfaces 70, 72 extend from respective ends of inner surface 68 to join the outer surface 74. Similar fluted, convex portions 76, 78, and 80, 82 are provided for the top and bottom members 60, 62 respectively of each bottom corner retainer bracket.

As in the case of the side channel brackets, the fluted convex portions in the bottom corner brackets readily enable mounting and dismounting of the character 32.

In a constructed embodiment of the invention, each of the side channel brackets 28, 30 was constructed 1½ inches long with a channel 42 inside dimension of between ⅛ to ¼ inch and an outer dimension of ⅜ to ⅝ inch. The corner retainer brackets 24, 26 were constructed with the same inner and outer channel dimensions and with each leg of the L-shaped member being about ¾ inch long.

Other structural configurations for the brackets are possible. As an example, the side brackets may be constructed with an H-shaped cross section, that is, two respectively parallel top and bottom portions on each side of an intermediate member to define two longitudinal channels. With such a configuration the display character positions would be side by side on the copyboard with the characters closer together than as shown in FIG. 1. In a similar manner the corner brackets can be double ended so as to provide two corner channels on each side of the intermediate member in the form of an upside down T-shaped cross section.

The foregoing detailed description has been given for clearness of understanding only, and no unnecessary limitations should be understood therefrom, as modifications will be obvious to those skilled in the art.

What is claimed is:

1. A changeable copyboard display for flat display characters bearing oriental language characters, said changeable copyboard display comprising:
   a frame including a copyboard background;
   a plurality of discrete display positions on said copyboard background, each of said discrete display positions including,
   a pair of transparent side channel members mounted on said copyboard background at opposite sides of said display position, each of said transparent channel members including a longitudinal channel for receiving one of said display characters, and
   a pair of transparent bottom corner retainer brackets mounted on said copyboard background at opposite corners of said display position for retaining and restraining said flat display character from substantial movement on said copyboard;
   means for mounting said transparent paired side channel members and said transparent paired bottom corner retainer brackets to define said plurality of discrete display positions in a series of vertically aligned columns on said copyboard background for reading said oriental characters from the right bottom most position upwardly and from bottom to top continuing to the top left most display position;
   each of said retainer brackets including an L-shaped corner channel enabling said flat display characters to be slidably inserted into said discrete display position; and
   respective convex surfaces at each end of said longitudinal channels and said corner channels for enabling ready slidable insertion of said flat display characters into said side channel members and said corner retainer brackets at said discrete display positions.

2. A changeable copyboard display for flat display characters bearing oriental language characters, said copyboard display comprising:

a frame including a changeable copyboard background;

a plurality of flat, image-bearing display characters for displaying oriental language characters;

mounting means for changeably mounting said display characters in a series of discrete vertically alinged columns on said copyboard background, each of said discrete vertically aligned columns including a plurality of discrete display positions for reading said oriental characters from the right bottom most position upwardly and from bottom to top continuing to the top left most display position, said mounting means including;

a plurality of transparent paired side channel members each having a bottom, top and an intermediate back portion defining a longitudinal channel therebetween for insertion of said display character;

a plurality of paired transparent L-shaped corner retainer brackets each having a bottom, top and an intermediate back portion defining a corner channel therebetween for retaining and restraining from substantial movement said display character insertable therein;

means for rigidly mounting said transparent paired side channel members oppositely disposed on said copyboard background with said respective longitudinal channels facing each other;

means for rigidly mounting said transparent paired corner retainer brackets oppositely disposed on said copyboard background below a respective pair of said side channel members with said respective corner channels facing each other;

each of said transparent paired side channel members and corner retainer brackets defining a discrete display position;

said image bearing display character inserted through said longitudinal channels and said corner channels for releasably mounting to said copyboard at the respectively defined discrete display position.

3. A changeable copyboard display as claimed in claim 2, including respective convex surfaces at each end of said longitudinal channels and said corner channels for enabling ready slidable insertion of said flat display characters into said side channel members and said corner retainer brackets at said discrete display positions.

\* \* \* \* \*